May 4, 1965  L. GELFAND ETAL  3,182,162
SAFETY SWITCH FOR AUTOMOBILE INSTRUMENT PANEL
Filed Jan. 22, 1962
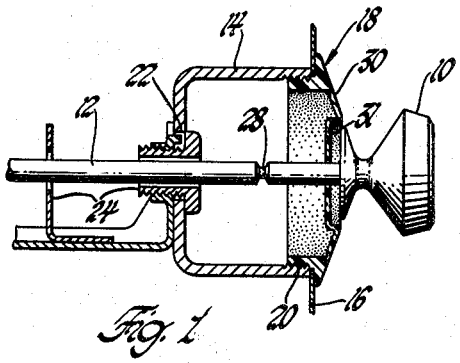
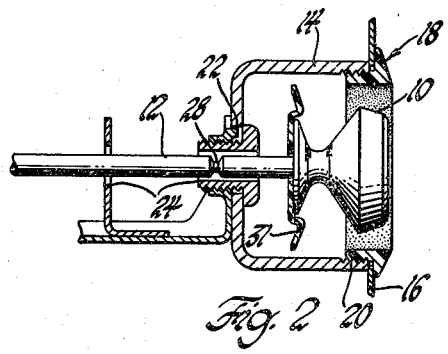
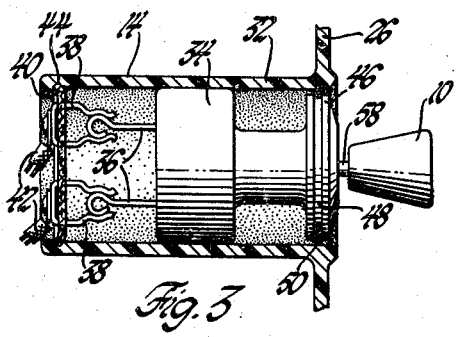
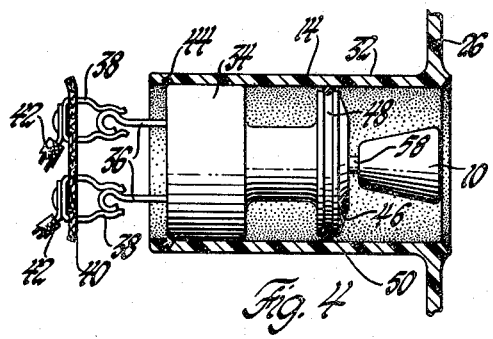
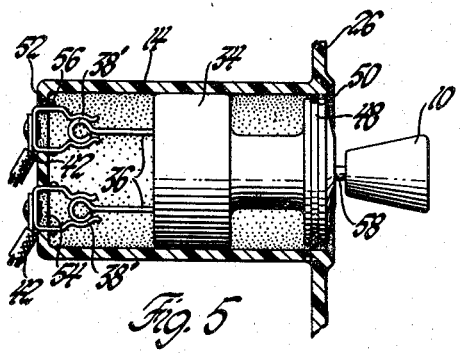
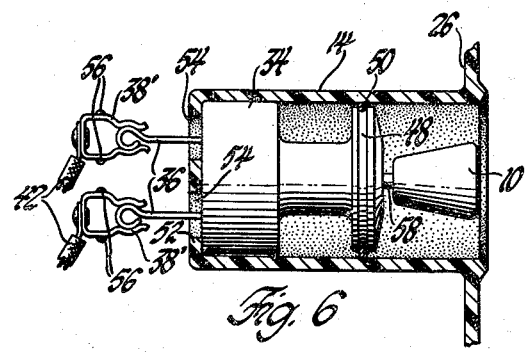
INVENTOR.
Louis Gelfand &
BY Suzanne E. Vanderbilt
Paul J. Ethington
ATTORNEY

United States Patent Office 3,182,162
Patented May 4, 1965

3,182,162
SAFETY SWITCH FOR AUTOMOBILE INSTRUMENT PANEL
Louis Gelfand, Detroit, and Suzanne E. Vanderbilt, Royal Oak, Mich., assignors to General Motors Corporation, Detroit, Mich., a corporation of Delaware
Filed Jan. 22, 1962, Ser. No. 167,885
7 Claims. (Cl. 200—168)

This invention relates to a switch assembly for use on an automobile instrument panel and more particularly to a switch assembly employing a protruding control element which is displaceable to a position within the instrument panel upon application of a predetermined load.

The technological advances which have resulted in increasing speed and maneuverability of automobiles have been accompanied by efforts to make automobiles safer for their passengers. Statistics indicate that a great many injuries received by passengers of automobiles involved in accidents are the result of the passengers making contact with stationary objects mounted within the cars. For this reason, such safety precautions as padded dashboards and collapsible steering wheels have evolved. However, the average automobile instrument panel still exhibits a large number of protrusions which could inflict an injury upon a person thrown forward against such a protrusion as the result of a rapid deceleration of the automobile. The majority of these protrusions are manual control elements for switch assemblies which are used to operate many remote mechanisms such as windshield washers, lights, radio, and so forth. Past efforts to make these switches safer have been complicated by the fact that it is necessary for ease of operation that these control elements be conveniently located on the instrument panel where they are readily accessible.

It is now proposed to provide a switch assembly for use on an automobile instrument panel having a conveniently accessible control element which protrudes from a hollow housing within the instrument panel wherein under a predetermined load caused by the impact of a passenger against the control element, the control element will be displaced to a position substantially, if not totally, within the hollow housing and thus within the forward surface of the instrument panel. This displacement of the control element acts to cushion the impact of the passenger against the control element and greatly reduces the probability of injury. This is accomplished through the use of a switch assembly housing having therein yieldable positioning and retaining means for the control element. The yieldable positioning and retaining means are adapted to allow the control element and switch assembly to be displaced axially to a position within the instrument panel upon the application of a predetermined load to the control element.

The present invention also provides a method for preventing injury from oblique blows to the control element. This is accomplished by providing on the support means or shaft for the control element a substantially weakened area which will yield or fracture upon sufficient impact.

Another advantage of the proposed switch assembly is that it may be maintained in an operable state after having been displaced to the position within the instrument panel. Additionally, the yieldable positioning means are fashioned such that the switch may be easily restored to its original position without the necessity of special tools or knowledge.

These and other advantages of the present invention will be more readily understood upon reading the following specification taken with the accompanying drawing of which:

FIGURE 1 is a cross sectional view of a switch assembly embodying the present invention;

FIGURE 2 is illustrative of the condition of the switch assembly of FIGURE 1 after impact;

FIGURE 3 is a cross sectional view of an alternate embodiment of the present invention in a switch assembly for controlling an electrical device;

FIGURE 4 is an illustration of the switch assembly of FIGURE 3 after impact;

FIGURE 5 is a cross sectional view of a further alternative embodiment of the present invention in a switch for controlling an electrical device; and FIGURE 6 is an illustration of the condition of the switch assembly of FIGURE 5 after impact.

In the drawings there is illustrated a switch assembly which may be used to control the operation of an external mechanism such as the various mechanisms found in an automobile. The switch assembly is particularly adapted for association with an automobile instrument panel or dashboard. The assembly comprises basically a hollow housing having the forward end thereof, that is, the end nearest the occupants of the vehicle, mounted flush with the surface of the instrument panel. Disposed within the housing is a support member which may, for example, be a shaft. This support member is attached to the control element or knob which protrudes out of the front of the housing so as to be easily grasped by one's hand. Also mounted within the housing is a yieldable retaining or positioning means which interconnects the support member and the housing wall to maintain the assembly firmly in position for normal use. Upon sufficient axial load applied to the control element, the retaining means is designed to yield to the load allowing the support member and the control element to be displaced into the housing; thus, lessening or eliminating any injury to a passenger of the vehicle caused by impact with the control element. Additionally, the shaft or support member for the control element is substantially weakened at a particular point such that lateral or oblique impact to the control element will cause the shaft to yield or fracture. The impact load required to either axially displace the switch assembly into the housing or to bend or fracture the control element shaft is substantially greater than that employed during normal operation of the switch assembly.

Referring now to FIGURE 1, there is shown a switching assembly employing the present invention. This switch may be employed to control the operation of, or application of power to, an external device such as a light, motor, hydraulic device, or the like. The operation of the external mechanism is conveniently controlled by the disposition of a control element or knob 10. With the present invention it is not crucial whether the switching action is obtained by an axial displacement of the knob 10 or by rotation thereof. The knob 10 is suitably mounted on a support means or shaft 12. The shaft 12 extends substantially through the center of a cylindrical cup-like housing 14. The housing 14 is adapted to be mounted with the forward, or right, end, as shown in the drawing, substantially flush with the surface of an instrument panel 16. The rearward, or left, end of the housing 14 extends rearwardly of the instrument panel 16 surface so as to be out of the sight of passengers of the automobile. A retaining member or bezel 18 is adapted to be mounted on the forward end of the housing 14 by means of the cooperatively threaded areas 20 of the respective elements 14 and 18. For purposes of mounting and positioning the elements of the switch assembly on the instrument panel 16, the radially outermost portion of the bezel 18 and the facial surface of the forward end of the housing 14 provide a tight grip on the instrument panel 16. An aperture 22 in the bottom or rearward end of the housing 14 provides an opening for the shaft 12. This aperture 22 also provides a convenient mounting place for further support and guide elements 24.

The bezel 18, which may be constructed of a yieldable material such as plastic, is formed so as to have an annular weakened area 30 therein. The weakened area 30 is of substantially lesser strength than the rest of the bezel 18 and will yield or fracture under sufficient stress to separate an inner portion 31 of the bezel from the remainder thereof.

Located on the shaft at a position intermediate the rearward end of the housing 14 and the knob 10 is a substantially weakened area 28. The weakened area 28 is shown as a small portion of reduced shaft diameter. However, it is contemplated that this portion could also consist of a material insert which is substantially softer or more flexible than the remainder of the shaft 12. It can be seen that upon impact to the knob 10 from the side, the weakened area 28 will allow the knob 10 to be displaced laterally from its position of axial alignment with the housing 14. Upon such side or lateral impact the weakened area 30 of the bezel 18 will also yield or fracture.

FIGURE 2 illustrates the effects of an axial impact to the knob 10. It is seen that the weakened area 30 of the bezel 18 has fractured to allow the knob 10, the shaft 12, and the inner portion 31 of the bezel 18 to be displaced axially into the housing 14. In this position, the knob 10 has been displaced to a position substantially within the housing 14. Thus substantial injury to passengers is avoided. It can also be seen that with the protruding control element 10 safely within the housing 14, full advantage of instrument panel padding can be realized. To restore the switch assembly to operation, it is a simple matter of removing the bezel 18 and replacing it with a new relatively inexpensive part.

FIGURES 3 and 4 are illustrative of an embodiment of the present invention in a switch for controlling the operation of an electrical device. In this embodiment, the housing 14 is shown as consisting of a cylindrical barrel 32 which is molded or otherwise formed integrally with an instrument panel 26. Similarly to FIGURE 1, the forward end of the housing 14 is substantially flush with the instrument panel 26 with the barrel 32 extending rearwardly behind the instrument panel 26. In the normal operating position of the switch assembly shown in FIGURE 3, the control element or knob 10 is disposed in a protuberant position with respect to the forward end of the housing 14 so as to be conveniently accessible. The actuating portion of the switch assembly, which is not shown in the drawing, may be mounted within an inner positioning member 34 which is disposed within the housing 14 so as to be axially displaceable with respect thereto. It is contemplated that the actuating portion may comprise one of the known types of multiple stage switching mechanisms. These known types include those which are actuated by either axial displacement or rotation of the control element or a combination. The particular form which this mechanism takes is not crucial to the invention. It is, however, to be understood that an operable connection is made between the knob 10 and the switching mechanism. A further operable connection between the switching mechanism and the external device will become apparent in the following. Attached to the positioning member 34 and operatively connected to the switching mechanism contained therein is a pair of switch terminals 36. The terminals 36 may represent input and output terminals to the switching mechanism within the inner positioning member 34. The terminals 36 are adapted for snap engagement with a pair of snap-type receiving contacts 38 which are permanently mounted in a resilient cylindrical disc 40. The resilient disc 40 is made of a non-conducting material, such as plastic. The contacts 38 may be electrically connected to a power supply (not shown) and the external electrical mechanism by means of the conductors 42. The conductors 42 may be riveted to the bottom of the contacts 38 as shown. It is to be understood that the terminals 36 and the contacts 38 are formed as separate elements for purposes of installation. It is possible that these elements may be consolidated into a pair of single units if desired.

Formed within the inner cylindrical surface of the housing 14 adjacent the bottom or rearward end of the housing is an annular groove 44. The yieldable periphery of the disc 40 is adapted to fit securely within the groove 44 to retain the contacts 38 in position. Since the contacts 38 also act to secure the inner positioning member in place by means of the terminals 36, the disc 40 acts as a retaining member to maintain the entire switch assembly in a proper normal position within the housing 14.

The inner positioning member 34 is shown as consisting of a cylindrical forward section 46 having a diameter slightly less than the inner diameter of the housing 14. Formed within the outer periphery of the section 46 is an annular groove 48. Seated within the groove 48 is an annular ring 50 of expanding material also adapted to maintain the inner positioning member 34 firmly in position within the housing 14. It can be seen, however, that the ring 50 will also allow the switch assembly to be displaced axially into the housing 14 under a predetermined load.

As shown in FIGURE 4, when there is applied to the knob 10 an axial load of sufficient magnitude to cause the outer periphery of the disc 40 to yield, the disc 40 will be displaced from the groove 44. Thus, the entire switch assembly including the knob 10, inner positioning member 34, terminals 36, contacts 38, and the disc 40 will be displaced to a position within the outer surface of the instrument panel 26. It can further be seen that the wiring arrangement including conductor 42 has not been disturbed, the terminals 36 are still in engagement with the contacts 38, and the switch is still in an operable condition. It remains only to restore the disc 40 to its proper position within the groove 44 and the switch assembly will be again ready for normal operation. The groove 44 and the outer periphery of the disc 40 are inclined toward the innermost portion of the housing 14 such that the ring 40 may be returned to its proper position within the groove 44 with less pressure than that required to displace the assembly out of its proper position.

From a consideration of the embodiment shown in FIGURES 3 and 4, it is apparent that the resiliently yieldable relation between the disc 40 and the groove 44 may be obtained in an alternative manner. For example, the disc 40 may be constructed of a rigid non-conductive material while the housing 14 is the resilient member. In this case, the loading on the control element causes the housing 14 to deform locally of the groove 44 to allow the disc 40 to be displaced therefrom.

FIGURES 5 and 6 show a further alternative embodiment of the invention. The assembly shown in FIGURE 5 is similar to that of FIGURE 3 and comprises a knob 10 and an inner positioning member 34 employing a ring 50 which is seated within a groove 48 to maintain the switch assembly in a proper lateral position within the housing 14. The assembly further comprises a pair of terminals 36, a pair of snap-type contacts 38′, and a pair of conductors 42 firmly attached to the contacts 38′. However, in FIGURE 5, a distinct type of yieldable retaining means is employed. In this embodiment, the housing 14, which again may be formed integrally with the instrument panel 26, is also formed so as to have an integral bottom 52. Formed within the bottom 52 of the housing 14 are a plurality of apertures 54 which are adapted to receive the contacts 38′. Each of the contacts 38′ is made of a spring-like conductive material and has formed in the sides thereof, a pair of resilient protrusions 56. The protrusions 56 prevent the contacts 38′ from being displaced rearwardly through the apertures 54 under normal operating conditions. The connections for the conductors 42 prevent the contacts 38′ from being displaced to the right as shown in the drawings and, thus, the entire switching assembly is maintained in the proper position within the housing 14.

It can be seen that the switching assemblies thus far described have the advantage of great installation ease. Once the snap-type contacts 38′ are secured in position in the bottom 52 of the housing 14, the balance of the switch assembly is easily snapped into position within the cylindrical housing 14.

As previously mentioned, the protrusions 56 are effective to maintain the contacts 38′ in a proper position within the apertures 54. However, when a load is applied to the knob 10 whose axial component exceeds a predetermined amount, the protrusions 56 will yield and allow the contacts 38′ to be displaced rearwardly through the apertures 54. Thus, the inner positioning member 34 and the knob 10 may be displaced into the housing 14 to the extent shown in FIGURE 6. In this position, the knob 10 is entirely within the housing 14. As was the case for the assembly of FIGURE 3, the switch is still in an operable condition when in this position. To return the switch assembly to its proper position, it is required only to resnap the contacts 38′ back into position within the apertures 54. This will most easily be accomplished by removing the contacts 38′ from the terminals 36.

In order to provide safety from injury due to blows at right angles to the axis of the housing 14, the knob 10 of the switch assemblies, shown in FIGURES 3 through 6, may be attached to the positioning member 34 by means of a short shaft 58. This shaft 58 may be constructed of a soft yieldable material which will give way under predetermined loading.

It can be seen that there has been presented a device which is a substantial contribution to the safety of the passengers of a motor vehicle. While the improved safety switch has been shown and described in particular form, it is contemplated that the inventive concept therein may be incorporated into a number of various modifications. For a definition of the invention, reference should be made to the appended claims.

We claim:

1. A switch assembly for use on a vehicle instrument panel employing a protruding control element which is displaceable to a position within the instrument panel upon application of a predetermined load to the control element, the assembly comprising, a hollow housing having a forward end adapted to be mounted flush with the surface of an instrument panel and a rearward end displaced rearwardly from the panel surface, a control element normally disposed in a protuberant relation with the forward end of the housing and operatively connected to control the operation of an external mechanism while maintaining said protuberant relation, the hollow housing being adopted to accommodate the control element in a position substantially within the housing, a shaft normally disposed within the housing in axial alignment therewith and axially displaceable therein, the control element being operatively mounted on one end of the shaft, retaining means disposed between the housing and the shaft and normally in mutual contact therewith for maintaining the control element in the protuberant position, the retaining means being yieldable to separate at least a portion thereof from contact with the housing upon application of a predetermined axial load to the control element thereby to allow the control element and the shaft to be displaced axially rearward into the housing, the predetermined load being substantially greater than that employed in normal operation of said control element.

2. A switch assembly for use on a vehicle instrument panel employing a protuding control element, the assembly comprising, a hollow housing having a forward end adapted to be mounted flush with the surface of an instrument panel and a rearward end displaced rearwardly therefrom, a control element normally disposed in a protuberant relation with the forward end of the housing and operatively connected to control the operation of an external mechanism while maintaining said protuberant relation, the hollow housing being adapted to accommodate the control element in a position substantially within the housing, support means connected to the control element and displaceably disposed within the housing, retaining means operatively connected with the support means and the housing for normally maintaining the control element in the protuberant relation, the retaining means being yieldable to separate at least a portion thereof from operative connection with the housing upon application of a predetermined load to the control element thereby to allow the control element to be displaced axially into the housing, the predetermined load being substantially greater than that employed in normal operation of the switch assembly.

3. A switch assembly for controlling the operation of an external mechanism, the assembly comprising, a hollow housing having a forward end adapted to be mounted flush with the surface of an instrument panel and a rearward end displaced rearwardly from the panel surface, a control element normally disposed in a protuberant relation with the forward end of the housing and operatively connected to control an external mechanism in accordance with the disposition of the element while maintaining said protuberant relation, the hollow housing being adapted to accommodate the control element in a position substantially within the housing, support means connected to the control element and disposed within the housing, the support means being axially displaceable with respect to the housing, connecting means carried by the support means and operatively connected between the control element and the external mechanism, retaining means mutually associated with the housing and connecting means for normally maintaining the control element in the protuberant position, the retaining means being yieldably associated with said housing to separate therefrom under a predetermined load to allow the control element, the connecting means and the support means to be displaced axially to a position wherein the control element is substantially within the housing, the predetermined load being substantially greater than that employed in normal operation of said control element.

4. A switch assembly for controlling the operation of an external mechanism, the assembly comprising, a hollow housing having a forward end adapted to be mounted flush with the surface of an instrument panel and a rearward end displaced rearwardly from the panel surface, a control element normally disposed in a protuberant relation with the forward end of the housing and operatively connected to control an external mechanism in accordance with the disposition of the element while maintaining said protuberant relation, the housing being adapted to accommodate the control element in a position substantially within the housing, a shaft mounted within the housing in substantial axial alignment therewith and axially displaceable therein, the control element being operatively mounted on one end of the shaft, retaining means disposed between the shaft and the housing and in mutual contact therewith for normally maintaining the control element in the protuberant position with respect to the housing and in substantial axial alignment therewith, the retaining means being fracturable at a preselected point to allow the control element and the shaft to be displaced axially into the housing upon the application of a predetermined axial load to the control element, the shaft being yieldable at a preselected point to allow the control element to be displaced laterally with respect to the housing upon the application of a predetermined lateral load, the axial and lateral loads both being substantially greater than those experienced in normal operation of the switch assembly.

5. A switch assembly for changing the connections in an electrical circuit, the assembly comprising a hollow housing having a forward end adapted to be mounted flush with the surface of an instrument panel and a rearward end displaced rearwardly therefrom, a control element for selecting the connections in an electrical circuit in accordance with the disposition of the element, the housing being adapted to accommodate the control element in a position substantially within the housing, a positioning member disposed within the housing and axially displaceable with respect thereto, the control element being operatively connected to the positioning member, contact means carried by the positioning member and connected in circuit between the control element and an external circuit irrespective of the axial position of the control, resilient retaining means fixed to the contact means, the retaining means being resiliently engaged with the housing to normally maintain the positioning member in a position with respect to the housing wherein the control element protrudes substantially from the forward end of the housing, the retaining means being disengageable from the housing to allow the control element to be displaced axially into the housing upon the application of a predetermined axial load to the control element, the predetermined load being substantially greater than that employed in normal operation of the switch assembly.

6. A switch assembly for use on a vehicle instrument panel employing a protruding control element which is displaceable to a position within the instrument panel upon application of a predetermined axial load to the control element, the assembly comprising, a hollow cylindrical housing having a forward end adapted to be mounted flush with the surface of an instrument panel and a rearward end displaced rearwardly therefrom, the cylindrical inner surface of the housing defining an annular groove adjacent the rearward end thereof, a control element normally disposed in a protuberant position with respect to the forward end of the housing for controlling an external mechanism in accordance with the disposition of the element, the housing being adapted to accommodate the control element in a position substantially within the housing, a positioning member disposed within the housing and axially displaceable with respect thereto, the control element being operatively connected to the positioning member, contact means operatively connected to the positioning member and adapted to complete a connection between the control element and the external mechanism, a resilient retaining disc attached to the contact means and having the periphery thereof normally disposed within the annular groove thereby maintaining the control element in the protuberant position, the resilient retaining disc being axially displaceable from the disposition within the groove under a predetermined load whereby the control element is displaced axially into the housing, the predetermined load being substantially greater than that employed in normal switching operation.

7. A switch assembly for use on a vehicle instrument panel employing a protruding control element which is displaceable to a position with the instrument panel upon application of a predetermined axial load to the control element, the assembly comprising, a hollow cylindrical housing having a forward end adapted to be mounted flush with an instrument panel and a rearward end displaced rearwardly therefrom, the rearward end of the housing defining a plurality of apertures, a control element normally disposed in a protuberant position with respect to the forward end for controlling an external mechanism is accordance with the disposition of the element, the housing being adapted to accommodate the control element in a position substantially within the housing, a positioning member disposed within the housing and axially displaceable with respect thereto, the control element being operatively connected to the positioning member, contact means connected to the positioning member and adapted to complete an operative connection between the control element and the external mechanism, receiving means normally disposed within the apertures and adapted to engage with the contact means, resilient retaining means connected to the receiving means for yieldably maintaining the receiving means within the apertures thereby maintaining the control element in the protuberant position, the resilient means being yieldable when a predetermined load is applied axially to the control element to allow the receiving means to be displaced through the apertures thereby allowing the control element to be displaced into the housing, the predetermined load being substantially greater than that employed in normal switching operation.

References Cited by the Examiner

UNITED STATES PATENTS 1,509,676  9/24  Lawrence _____ 200—168

BERNARD A. GILHEANY, *Primary Examiner.*

ROBERT K. SCHAEFER, *Examiner.*